(12) United States Patent
Sandness et al.

(10) Patent No.: US 7,976,090 B2
(45) Date of Patent: Jul. 12, 2011

(54) MOVEABLE SIDE MOUNTED FIRE TRUCK HOSE BED

(75) Inventors: Robert George Sandness, Canton, SD (US); Scott M. Obbink, Valley Springs, SD (US)

(73) Assignee: Central States Fire App LLC, Lyons, SD (US)

( * ) Notice: Subject to any disclaimer, the term of this patent is extended or adjusted under 35 U.S.C. 154(b) by 296 days.

(21) Appl. No.: 12/417,235

(22) Filed: Apr. 2, 2009

(65) Prior Publication Data

US 2010/0252597 A1 Oct. 7, 2010

(51) Int. Cl.
*B60R 5/00* (2006.01)
*A62C 27/00* (2006.01)
(52) U.S. Cl. ............ 296/37.1; 296/3; 296/37.6; 280/4; 169/24

(58) Field of Classification Search ............ 296/3, 37.1, 296/37.6; 280/4; 169/24; 137/355.2, 355.28; 248/91, 92, 93
See application file for complete search history.

(56) References Cited

U.S. PATENT DOCUMENTS

| | | | | |
|---|---|---|---|---|
| 4,787,809 A * | 11/1988 | Zrostlik | ......................... | 414/557 |
| 6,006,841 A | 12/1999 | Hunke | | |
| 6,666,643 B1 * | 12/2003 | Heynssens | ..................... | 414/542 |
| 6,742,979 B1 * | 6/2004 | Salazar | .......................... | 414/522 |
| 7,111,884 B2 * | 9/2006 | Johnson | ......................... | 296/26.1 |
| 7,331,586 B2 | 2/2008 | Trinkner et al. | | |
| 2011/0037286 A1 * | 2/2011 | Nebel | ........................... | 296/37.6 |

* cited by examiner

*Primary Examiner* — Jason S Morrow
(74) *Attorney, Agent, or Firm* — Gordon & Rees LLP

(57) ABSTRACT

A fire truck equipped with a moveable side mounted fire truck hose bed, including: a fire truck chassis; a fire hose bed mounted onto a side of the fire truck chassis; and a mechanism for moving the hose bed between a lowered deployed position and an upper storage position.

5 Claims, 10 Drawing Sheets

MOVEABLE SIDE MOUNTED FIRE TRUCK HOSE BED

TECHNICAL FIELD

The present invention relates to fire trucks and to systems for storing fire hoses on fire trucks.

BACKGROUND OF THE INVENTION

There are many different fire truck designs currently on the market. Fire trucks are typically not a mass-produced item, but instead, many are individually designed and built. Fire trucks carry a significant amount of fire fighting equipment, including fluid tanks, pumps, ladders, aerial extenders, fire extinguishers, and various rescue and medical equipment. However, the largest volume of equipment carried by a typical fire truck is the fire hoses themselves.

Typically, fire hoses are loaded and carried in storage locations on the top or the back of the fire truck. As such, the fire hose is typically placed in a storage structure or bed that is substantially elevated above the ground. The biggest problem with this common design is that it makes it both difficult to unload the fire hoses before fighting the fire, and also difficult (and time consuming) to reload the fire hoses on the fire truck after the fire. This design approach is both ergonomically undesirable and quite time consuming. Moreover, when fire hoses are carried or accessed on the top of the fire truck, the placement of the fire hoses makes it difficult to also mount aerial extenders or ladders onto the top of the fire truck.

Solutions to this problem have been attempted, but they each have their own limitations.

For example, in one system patented by Hunke in U.S. Pat. No. 6,006,841, a retractable hose container is used. In this system, the hose container is motorized to extend straight out of the back of the fire truck (such that the fire fighters can grab the fire hoses at an appropriate level) after the moveable hose carrier has been fully deployed. A disadvantage of this system is that the deployment of the hose carrier dramatically increases the overall length of the fire truck (to almost double its normal length). Another disadvantage of this system occurs when reloading the hoses into the fire truck. Specifically, Hunke envisions the fire truck being driven backwards with the fire fighters working behind the truck reloading the fire hose. The firefighters behind the truck are not visible to the truck driver.

Another system patented by Trinker et. al. in U.S. Pat. No. 7,331,586 involves a hose storage structure that slides on an inclined plane between a lowered position (at which it protrudes from the back end of the fire truck) and an upper position (at which it basically rests on top of the fire truck). A first disadvantage of the Trinker et. al. system is that it is quite mechanically complex and cumbersome to operate. A second disadvantage of the Trinker et. al. system is that it uses up potential equipment storage space on both the back end and the top of the fire truck.

What is instead desired is a system which carries fire hoses in an out of the way location on a fire truck, yet presents these fire hoses for unloading (and for re-loading) at a height that is convenient for the firefighters to handle and operate. It is not desirable to have fire fighter reach up too high or bend down too low when handling fire hoses (which are quite heavy). Moreover, it is desirable that the system for carrying the fire hoses does not interfere with the capacity of the fire truck to carry additional fire fighting equipment. Thus, the desired fire hose handling system should not take up excessive space on or in the fire truck. Moreover, it is desirable that the system for carrying fire hoses does not involve a bulky extension to the fire truck itself, and therefore does not limit the maneuverability of the fire truck in tight situations.

SUMMARY OF THE INVENTION

The present invention provides a fire truck equipped with a moveable side mounted fire truck hose bed. Preferably, the system comprises: a fire truck chassis; a fire hose bed mounted onto a side of the fire truck chassis; and a mechanism for moving the hose bed between a lowered deployed position and an upper storage position.

As will be shown, an advantage of the present system is that the fire hose bed remains parallel to the ground when being moved between the lowered deployed position and the upper storage position.

In preferred aspects, a pair of mechanisms for moving the hose bed are provided, with one mechanism positioned at each end of the hose bed. Preferably, each of these mechanisms comprise: a lever arm connecting the moveable hose bed to the fire truck chassis, wherein the rotation of the lever arm moves the hose bed between the lowered deployed position and the upper storage position. Most preferably, the mechanism also comprises: a first rotatable actuator connecting one end of the lever arm to the fire truck chassis; and a second rotatable actuator connecting another end of the lever arm to the hose bed.

As a result, an advantage of the present system is that it provides convenient access to the fire hoses by the fire fighters. Moreover, the fire hoses are presented to the fire fighters at a height that is convenient to them to hold and manipulate. In addition, the hose bed is preferably fully retracted into a side of the fire truck when the hose bed is in the upper storage position. This minimizes the overall size of the fire truck. Yet another advantage of the present system is that it does not block the top of the fire truck (from carrying ladders, an aerial extender, or other equipment). Yet another advantage of the present system is safety. Specifically, the firefighters are not positioned behind the fire truck during the backing and loading operations. Instead the firefighters are clearly visible to the driver in the rear view mirror.

DETAILED DESCRIPTION OF THE DRAWINGS

Figure 1:
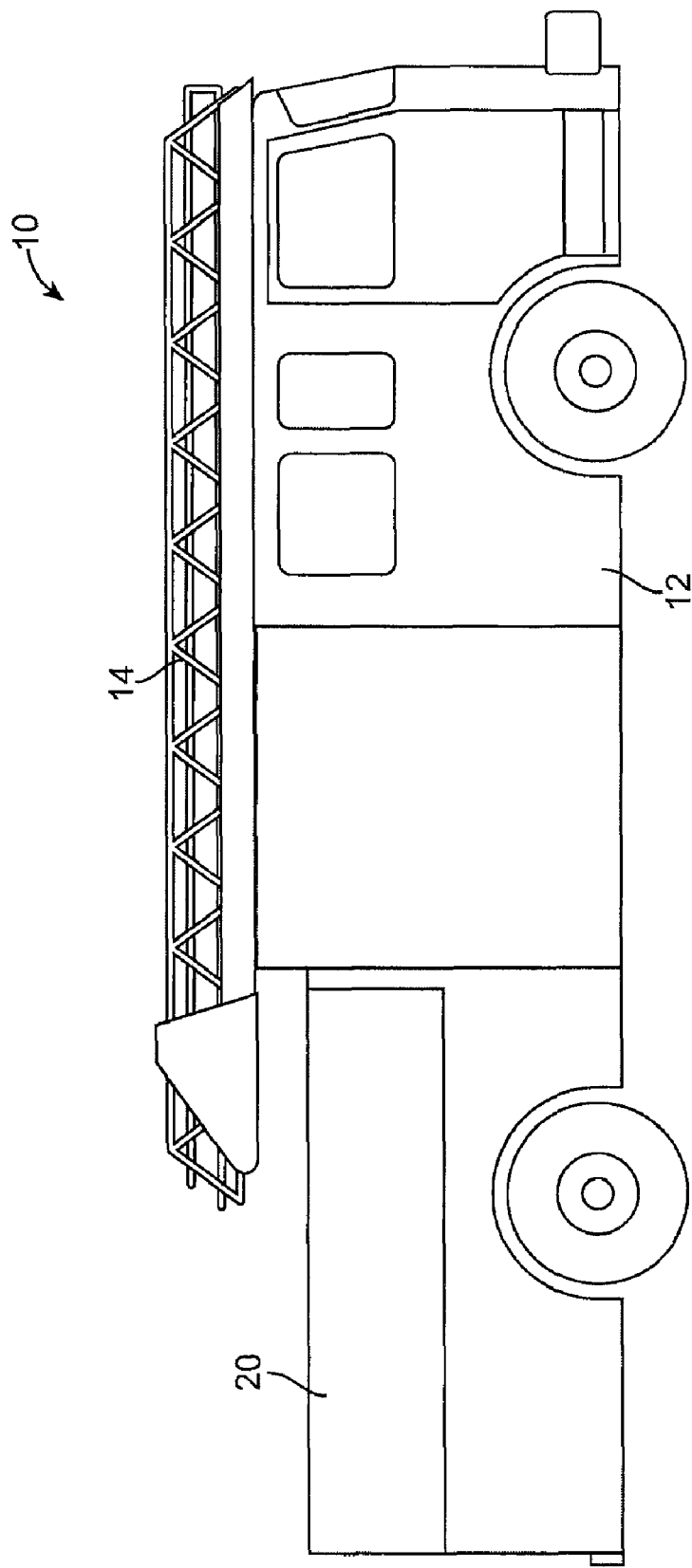
FIG. 1 is a side elevation view of the present invention in an upper storage position.
Figure 2:
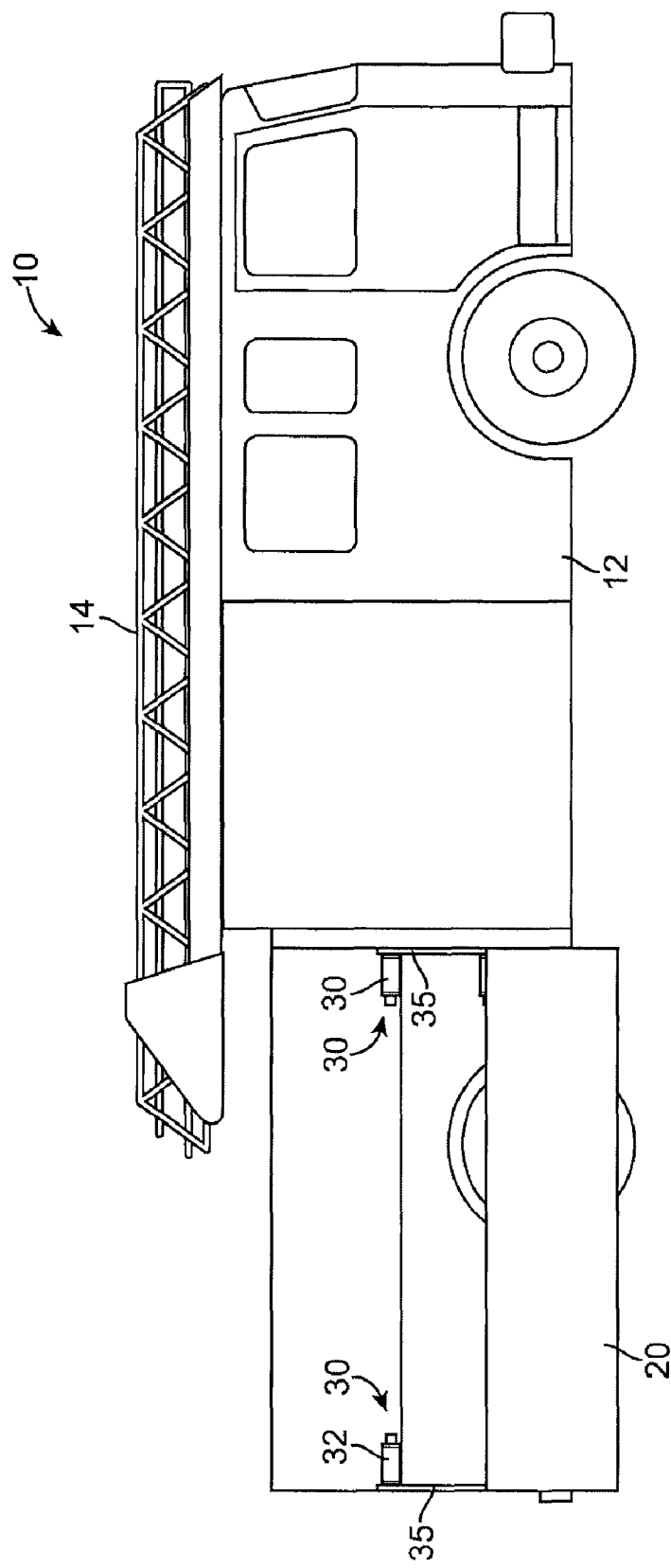
FIG. 2 is a side elevation view of the present invention in a lowered deployed position.
Figure 3:
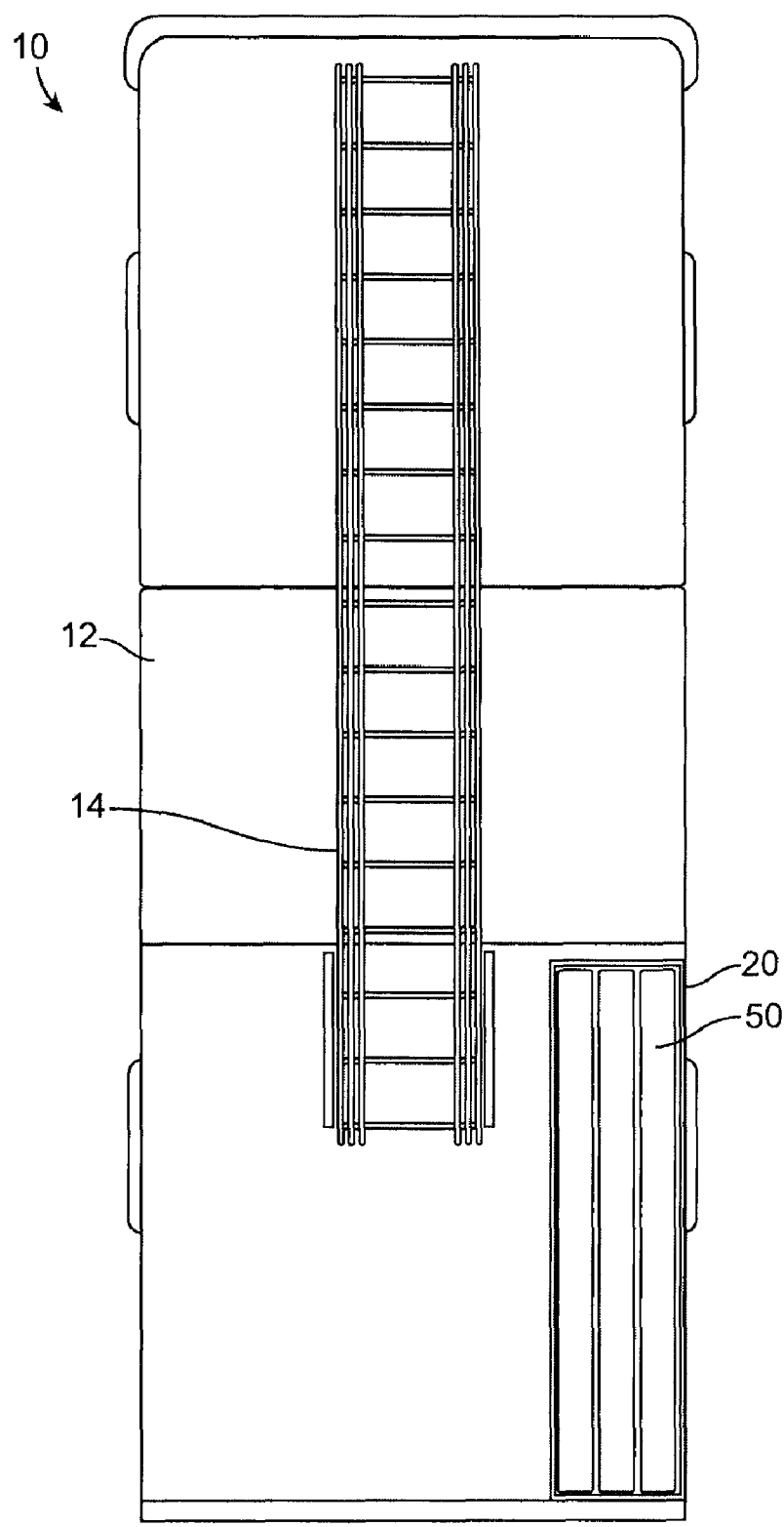
FIG. 3 is a top plan view of the present invention in an upper storage position.
Figure 4:
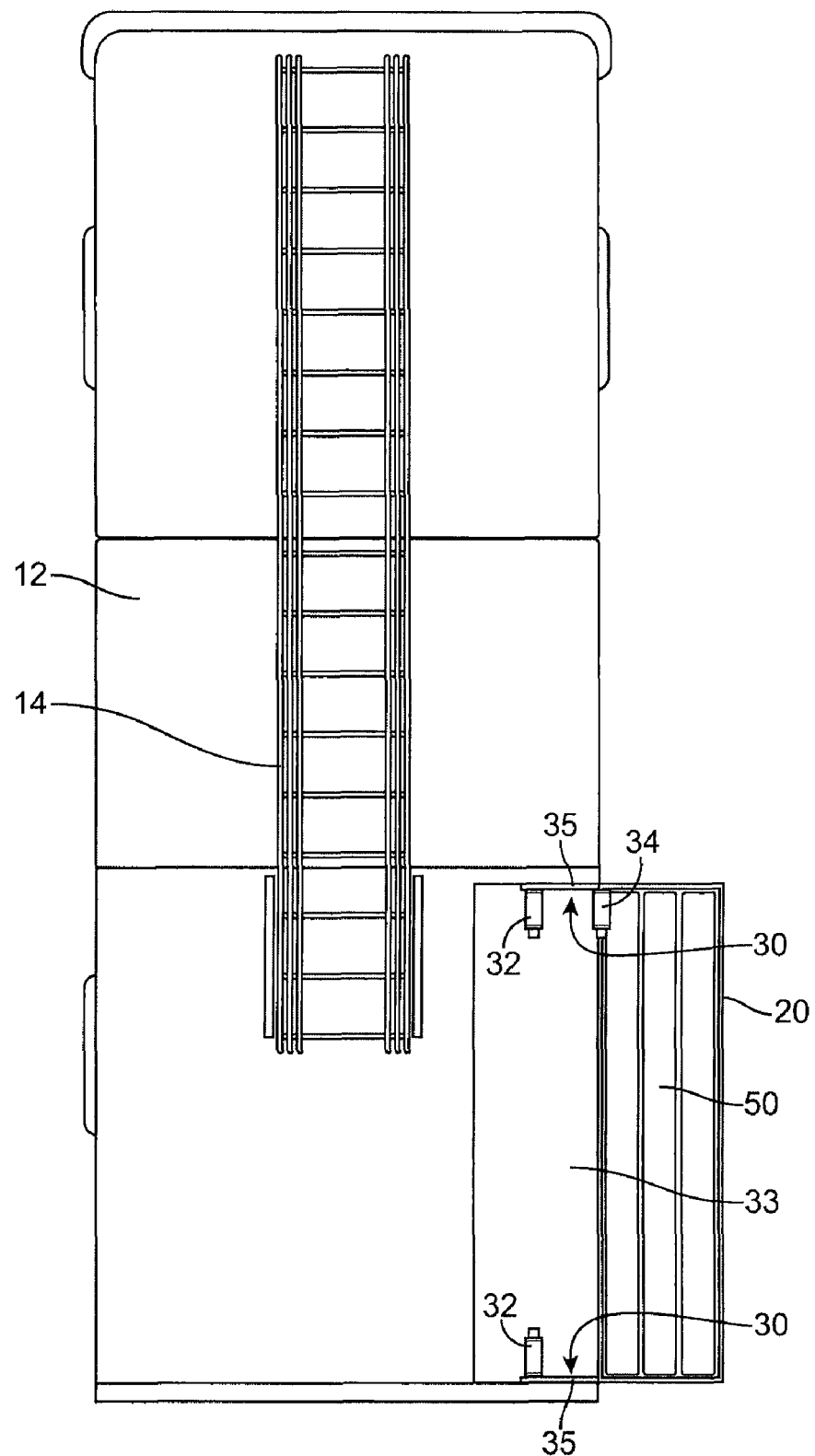
FIG. 4 is a top plan view of the present invention in a lowered deployed position.
Figure 5:
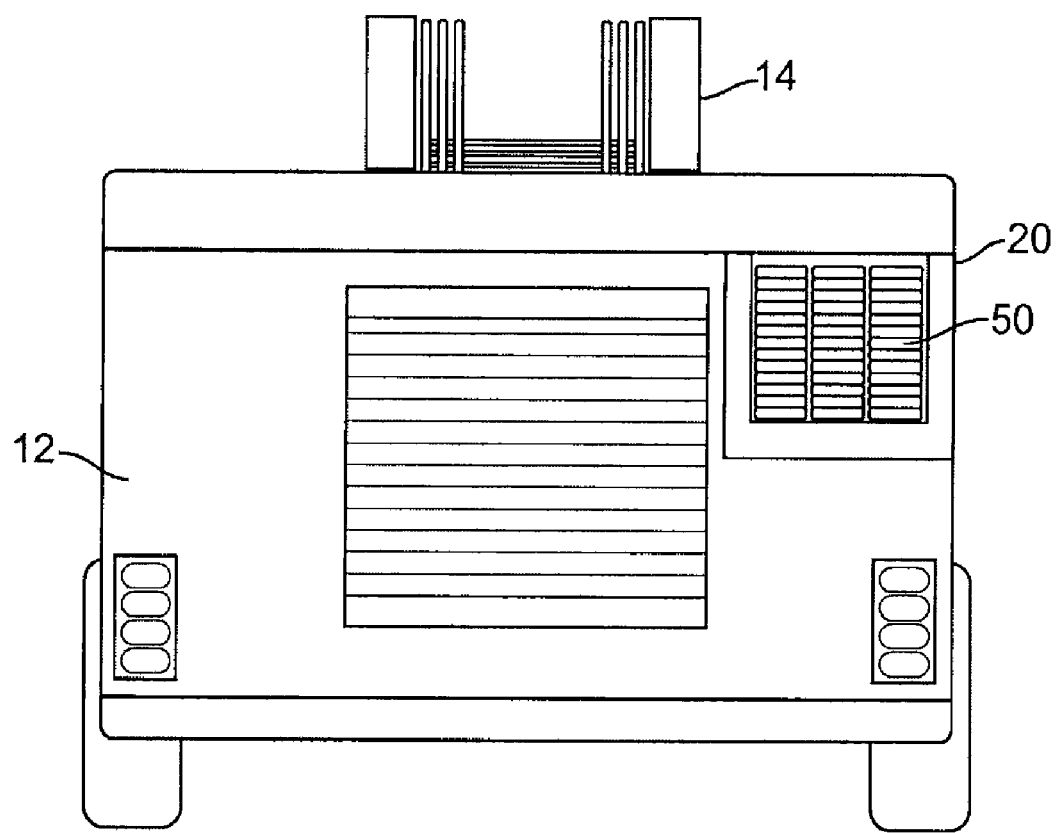
FIG. 5 is a rear elevation view of the present invention in an upper storage position.
Figure 6:
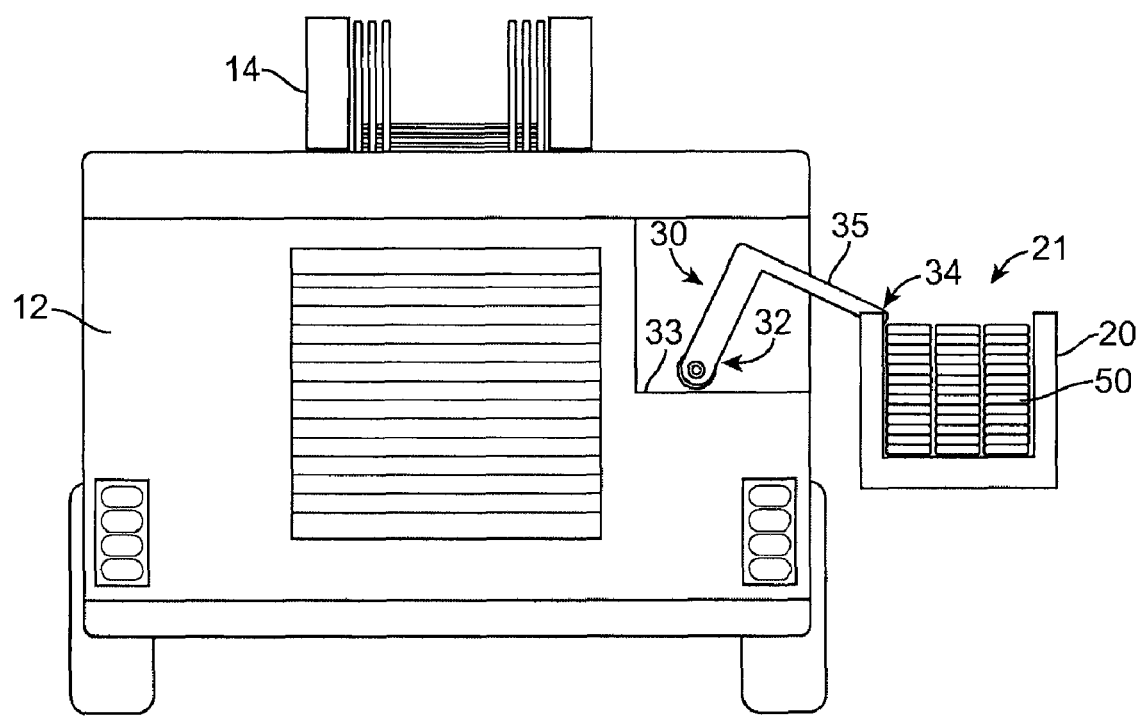
FIG. 6 is a rear elevation view of the present invention in an intermediate position.
Figure 7:
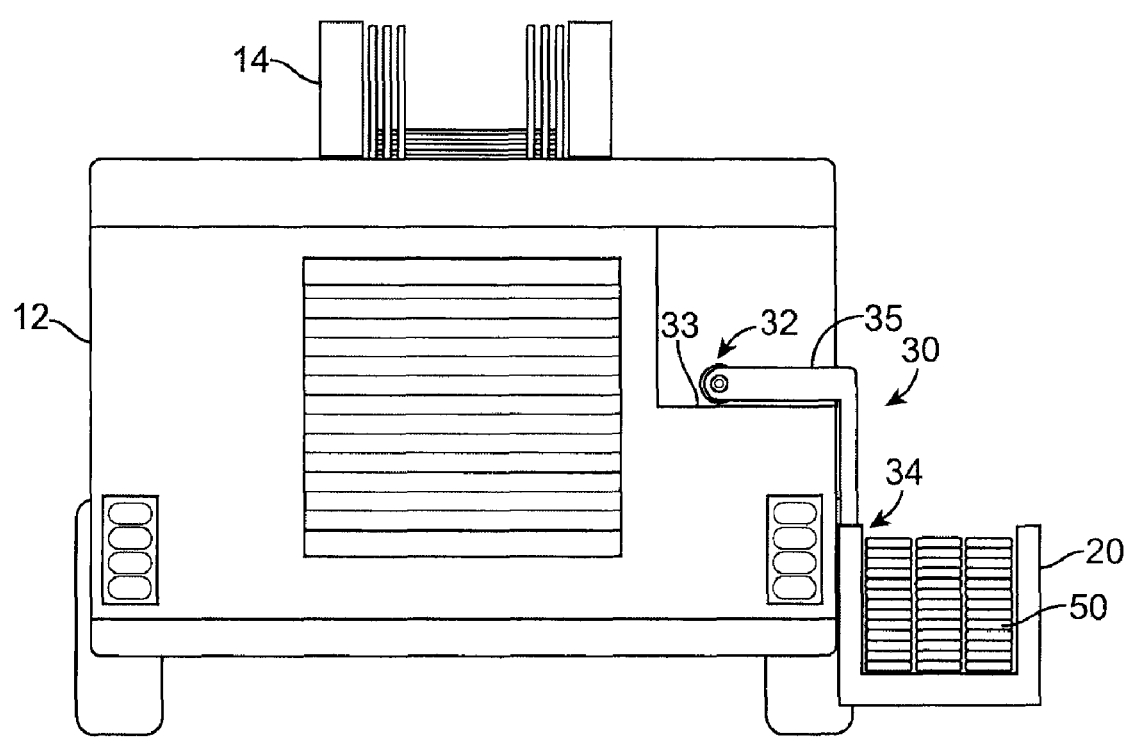
FIG. 7 is a rear elevation view of the present invention in a lowered deployed position.
Figure 8:
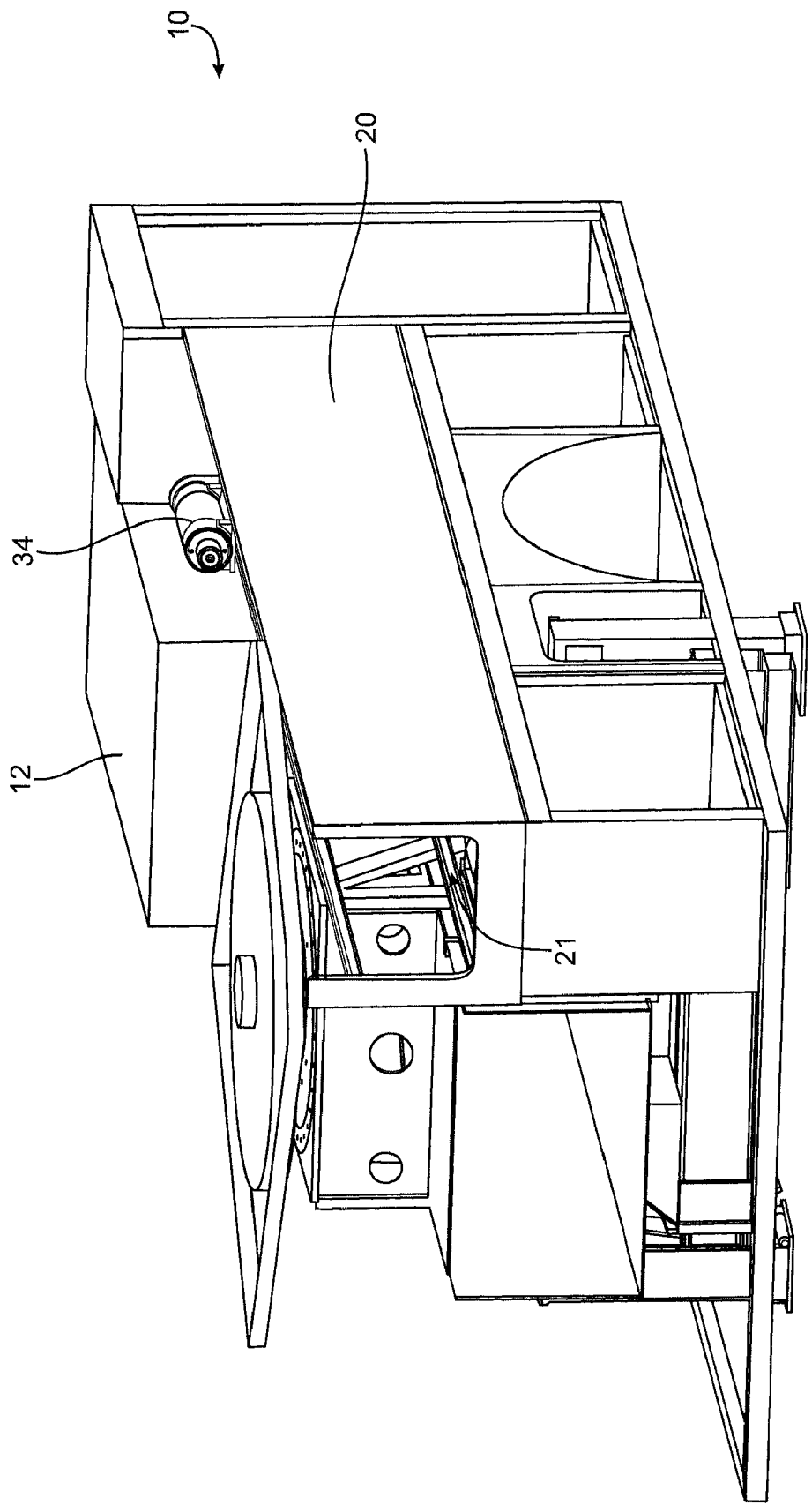
FIG. 8 is a rear perspective schematic view of the present invention in an upper storage position (showing a section of the chassis).
Figure 9:
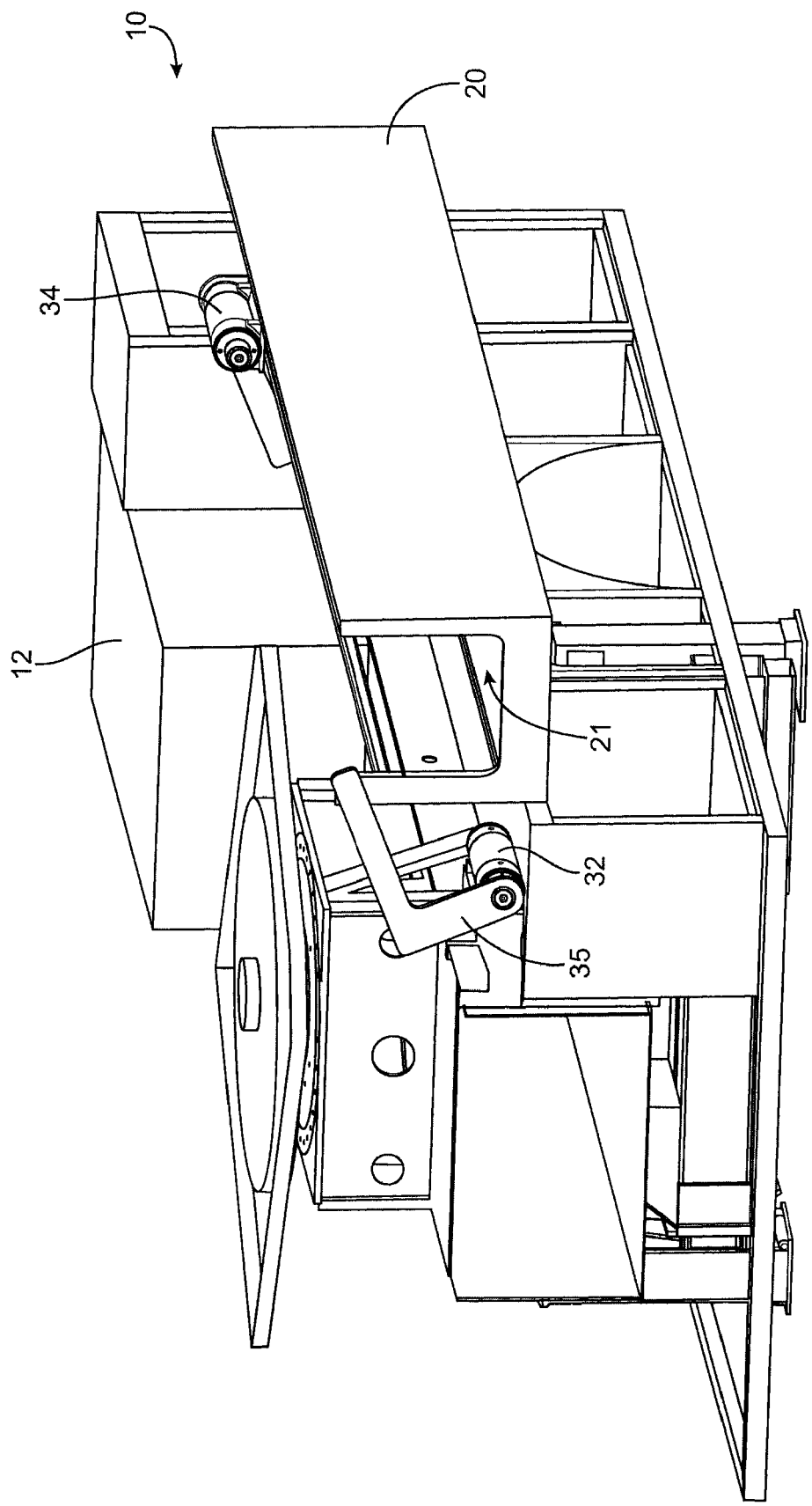
FIG. 9 is a rear perspective schematic view of the present invention in an intermediate position (showing a section of the chassis).
Figure 10:
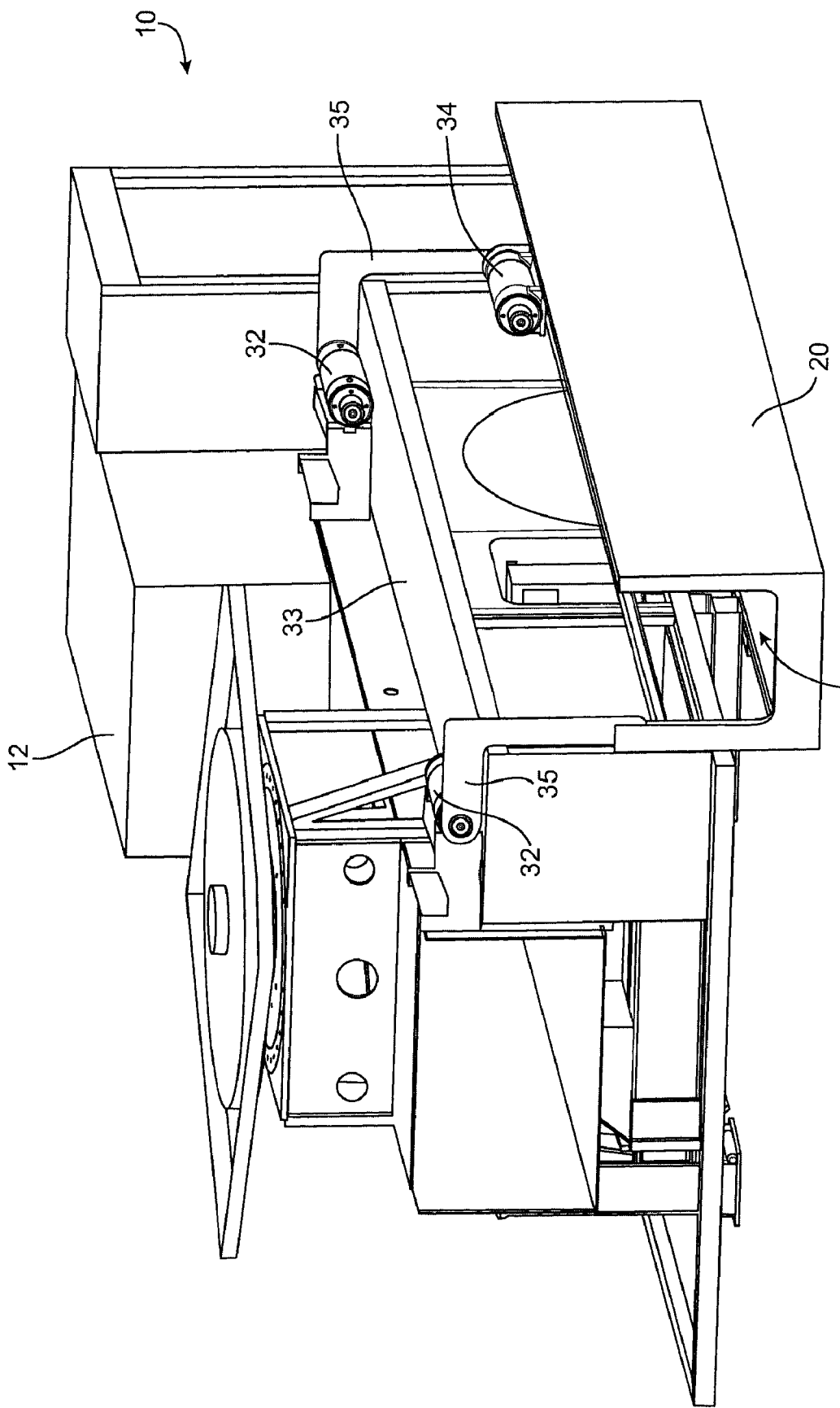
FIG. 10 is a rear perspective schematic view of the present invention in a lowered deployed position (showing a section of the chassis).

The present invention provides a fire truck equipped with a moveable side mounted fire truck hose bed. FIGS. 1, 3, 5 and 8 show the hose bed in an upper storage position (i.e.: when the fire hoses are packed away and/or when the fire truck is not in use (or is travelling to a fire scene). FIGS. 2, 4, 7 and 10 show the hose bed in a lowered deployed position (i.e.: when the firefighters are able to reach into the hose bed and pull out the fire hose, or when the firefighters are loading the fire hose back into the hose bed. FIGS. 6 and 9 show the hose bed at an intermediated position (either being raised or lowered).

As seen in the attached Figs., the present invention provides a system 10 comprising: a fire truck chassis 12; a fire hose bed 20 mounted onto a side of fire truck chassis 12; and a mechanism 30 for moving hose bed 20 between a lowered deployed position (FIGS. 2, 4, 7 and 10) and an upper storage position (FIGS. 1, 3, 5 and 8). As can be seen (in FIGS. 6 and 9), fire hose bed 20 remains parallel to the ground when being moved between the lowered deployed position and the upper storage position. Preferably, hose bed 20 has an open front end 21 to permit easy unloading and re-loading of fire hoses 50.

An advantage of the present system is that fire hose bed 20 does not take up excess space on the top of the fire truck. Thus, an aerial extender 14 can be provided on top of chassis 12. Moreover, as can also be seen, hose bed 20 is long and narrow and thus need not extend too far out from chassis 12 when in its fully deployed position. Thus, it does not limit the maneuverability of the fire truck (or prevent it from obtaining access in tight parking and access situations). As can be seen, hose bed 20 is preferably fully retracted into a side of the fire truck when hose bed 20 is in its upper storage position. Thus, fire hoses 50 are conveniently stored in an out of the way location when not in use.

Preferably, a pair of mechanisms 30 are provided (with one at each opposite end of hose bed 20). Each mechanism 30 preferably comprises: a lever arm 35 connecting moveable hose bed 20 to the fire truck chassis, wherein the rotation of lever arm 35 moves hose bed 20 between the lowered deployed position and the upper storage position. Also included are a first rotatable actuator 32 connecting one end of lever arm 35 to the fire truck chassis 12; and a second rotatable 34 actuator connecting another end of lever arm 35 to hose bed 20, as shown. Rotatable actuators 32 and 34 rotate together such that fire hose bed 20 remains parallel to the ground when being moved between the lowered deployed position and the upper storage position. When hose bed 20 is in its upper storage position, it rests upon shelf 33.

What is claimed is:

1. A fire truck equipped with a moveable side mounted fire truck hose bed, comprising:
   a fire truck chassis;
   a fire hose bed mounted onto a side of the fire truck chassis; and
   a mechanism for moving the hose bed between a lowered deployed position and an upper storage position, wherein the mechanism comprises:
   a lever arm connecting the moveable hose bed to the fire truck chassis, wherein the rotation of the lever arm moves the hose bed between the lowered deployed position and the upper storage position.

2. The fire truck equipped with a moveable side mounted fire truck hose bed of claim 1, further comprising:
   a first moveable actuator connecting one end of the lever arm to the fire truck chassis; and
   a second moveable actuator connecting another end of the lever arm to the hose bed.

3. The fire truck equipped with a moveable side mounted fire truck hose bed of claim 2, wherein the first and second moveable actuators move together such that the fire hose bed remains parallel to the ground when being moved between the lowered deployed position and the upper storage position.

4. The fire truck equipped with a moveable side mounted fire truck hose bed of claim 1, wherein the mechanism comprises a pair of identical mechanisms at opposite ends of the hose bed.

5. The fire truck equipped with a moveable side mounted fire truck hose bed of claim 1, wherein the hose bed is fully retracted into a side of the fire truck when the hose bed is in the upper storage position.

* * * * *